US 7,829,047 B2

(12) United States Patent
Dunham et al.

(10) Patent No.: US 7,829,047 B2
(45) Date of Patent: Nov. 9, 2010

(54) CATALYST FOR GENERATING OXIDIZED MERCURY FOR TESTING MERCURY CONTINUOUS EMISSION MONITORS (CEM)

(75) Inventors: Grant Dunham, Grand Forks, ND (US); Blaise Mibeck, Grand Forks, ND (US); Richard Schulz, East Grand Forks, ND (US); Stephen Wilmoth, Grand Forks, ND (US)

(73) Assignee: Energy & Environmental Research Center Foundation, Grand Forks, ND (US)

( * ) Notice: Subject to any disclaimer, the term of this patent is extended or adjusted under 35 U.S.C. 154(b) by 0 days.

(21) Appl. No.: 12/468,568

(22) Filed: May 19, 2009

(65) Prior Publication Data
US 2009/0285734 A1 Nov. 19, 2009

Related U.S. Application Data

(60) Provisional application No. 61/054,213, filed on May 19, 2008.

(51) Int. Cl.
*B01D 53/64* (2006.01)
*B01D 53/86* (2006.01)
*B01J 12/00* (2006.01)

(52) U.S. Cl. .................... 423/210; 422/168; 422/177

(58) Field of Classification Search ............. 502/325, 502/344, 516, 527.24; 423/210; 422/168, 422/177
See application file for complete search history.

(56) References Cited

U.S. PATENT DOCUMENTS

| 5,900,386 | A  | * | 5/1999 | Freund et al.         | 502/330 |
| 2008/0023016 | A1 | * | 1/2008 | Dellinger et al.      | 131/342 |
| 2009/0054230 | A1 | * | 2/2009 | Veeraraghavan et al.  | 502/344 |

OTHER PUBLICATIONS

G. Peto et al.; Electronic Structure of Gold Nanoparticles Deposited on SiOx/Si(100); Materials Science and Engineering C; (2002) pp. 95-99.
Masatake Haruta; Size- and Support-Dependency in the Catalysis of Gold; Catalysis Today 36; (1997) pp. 153-166.
R. Myer et al.; Surface Chemistry of Catalysis by Gold; Gold Bulletin; (2004) pp. 72-124.

* cited by examiner

*Primary Examiner*—Timothy C Vanoy
(74) *Attorney, Agent, or Firm*—Gifford, Krass, Sprinkle, Anderson & Citkowski, P.C.

(57) ABSTRACT

The present invention discloses a catalyst, system, and process for oxidizing mercury. The catalyst can include a substrate and a layer attached to at least part of the substrate. The layer contains a noble metal and has an average thickness of less than 100 nanometers. The substrate can be a plurality of glass fibers that provides for a relatively high surface area for the layer to be attached to. In the alternative, the substrate can be a porous substrate that provides for a high surface area for the layer to be attached to.

19 Claims, 12 Drawing Sheets

CATALYST FOR GENERATING OXIDIZED MERCURY FOR TESTING MERCURY CONTINUOUS EMISSION MONITORS (CEM)

CROSS-REFERENCE TO RELATED APPLICATIONS

This application claims the benefit under 35 U.S.C. 119(e) of U.S. Provisional Patent Application No. 61/054,213 entitled "Catalyst for Generating Oxidized Mercury for Testing Mercury Continuous Emission Monitors (CEMs)," filed May 19, 2008, the disclosure of which is hereby incorporated herein by reference.

STATEMENT REGARDING FEDERALLY SPONSORED RESEARCH OR DEVELOPMENT

This invention was made with U.S. government support under Contract No. CR 830929-01 awarded by the U.S. Environmental Protection Agency (EPA). The government has certain rights in this invention.

FIELD OF THE INVENTION

The present invention relates to a catalyst for producing oxidized mercury and, in particular, a catalyst for producing oxidized mercury for a continuous mercury monitor (CMM).

BACKGROUND OF THE INVENTION

In March of 2005, EPA issued the Clean Air Mercury Rule (CAMR). CAMR requires in part that coal-fired power plants perform continuous mercury measurements. Such measurements can be achieved and/or executed using CMMs that monitor flue gas Hg content. However, CMMs must be routinely tested and/or calibrated by injecting a known amount, sometimes referred to as a spike, of calibration gas into a flue gas system such that the CMM can detect the gas and provide a signal to be analyzed. While CMM calibrations are performed using elemental mercury and the system can be spiked with $Hg^0$, protocol can also require a weekly system integrity check using a National Institute of Standards and Technology (NIST)-traceable source of oxidized mercury.

NIST-traceable sources are currently used because heretofore liquid chemistry conditioning/conversion systems have included sinks such as cold spots that absorb residue(s) or sources such as condensation that desorb residue(s) of gaseous mercury. Such cold spots or sources naturally affect a CMM reading/signal and can produce erroneous results. In addition, dry reduction catalyst conversion systems can be compromised by flue gas-fly ash interactions and site-specific flue gas composition, in particular $SO_2$ concentration. As such, reliable calibration sources for characterizing the measurement system are important for the operation of a CMM.

Currently available technology for delivering oxidized mercury to a CMM for testing includes 1) permeation sources of solid mercuric chloride, 2) liquid sources of $HgCl_2$ combined with an injection system such as the HovaCAL system, and 3) thermal oxidizers such as the Spectra Physics thermal oxidizer. However, heretofore systems have exhibited limitations that have proven difficult to overcome.

For example, calibration gas cylinders for various $Hg^{2+}$ compounds exist, but can drift in concentration output because of low vapor pressure of the mercury and reactions with stainless steel. As such, use of these types of calibration cylinders with a CMM has proven inaccurate. Regarding permeation sources of solid mercury compounds, such sources have issues similar to the calibrated gas cylinders, with the added difficulty of containing several grams of hazardous material. In addition, permeation sources of $HgCl_2$ are unpredictable, susceptible to breakdown over time, highly temperature-sensitive, and unstable in that elemental mercury can form and be emitted by these devices—all of which can lead to fluctuations in output of elemental and oxidized mercury. As such, using either a calibration gas or permeation source requires a modified EPA measurement to determine the concentration being emitted.

Regarding liquid sources of $HgCl_2$ with an injection system, the HovaCAL system uses a laboratory balance and a carefully metered flow rate to inject a liquid calibration source into the sample stream. The system involves continuous measurement of the mass of a liquid source bottle, which is sensitive to vibrations, and control of the liquid flow rate and temperature. While none of these requirements is impossible to produce in the field, the technique is somewhat complicated and prone to failure. In addition, neither the permeation sources nor the HovaCAL system provide a source of elemental mercury for testing or calibration purposes, which is needed in both cases.

Thermal oxidizers such as the Spectra Physics System use a thermal reactor to thermally react mercury and chlorine in a tube furnace. To monitor the reaction, a simple atomic absorption instrument is built into the device to monitor the concentration of $Hg^0$. When the concentration of $Hg^0$ diminishes to zero, it is assumed that all of the mercury has been converted to a transportable oxidized gaseous form of mercury. However, mercury and chlorine can react to form mercury(I)chloride which, at typical transport tubing/line temperatures, can form a solid and cling to walls or break down and be released as elemental mercury. Another drawback of the thermal reactor method is that the thermal reactor is too large to be placed at a probe tip of a CMM.

Another limitation of current prior art systems is their lack of design to inject oxidized mercury into the probe tip of a CMM and, thereby, minimize spike gas transport distance. Stated differently, prior art systems have not been mountable in a flue gas duct adjacent to the probe of the CMM because of the systems' sensitivity to conditions such as temperature and vibrations and/or its size. Furthermore, some of the prior art systems and methods store and dispense gaseous oxidized mercury into a CMM rather than preparing gaseous oxidized mercury on demand for spiking purposes. Accordingly, there is an ongoing need for catalysts, systems, and processes for producing gaseous oxidized mercury for use in the testing of CMMs.

SUMMARY OF THE INVENTION

The present invention discloses a catalyst for oxidizing mercury and affording for the production of mercuric chloride which can be used for testing/calibration of CMMs. The catalyst can include a substrate and a layer attached to at least part of the substrate. The layer contains a noble metal and has an average thickness of less than 100 nanometers. The substrate can be a plurality of glass fibers that provides a large, high surface area for the layer to be attached to. In the alternative, the substrate can be a porous substrate that provides a large surface area for the layer to be attached to.

In some instances, the noble metal is gold and has a surface density on the substrate between 12 micrograms per square centimeter ($\mu g/cm^2$) and 25 $\mu g/cm^2$. The catalyst can be used at temperatures above 93° C. (200° F.) and can have a conversion efficiency of greater than 90%.

The invention also discloses a system for oxidizing mercury and producing a gaseous form thereof, the system including a chamber having a mercury inlet, an oxidant inlet, and an oxidized mercury outlet. A source of mercury can be included and be in fluid communication with the mercury inlet, as can a source of oxidant that is in fluid communication with the oxidant inlet. The catalyst can be located within the chamber, and a heater may or may not be included that is operable to heat the catalyst to a temperature above 93° C. (200° F.). The source of mercury is operable to provide fluid mercury to the chamber and into contact with the catalyst. The source of oxidant is also operable to provide fluid oxidant to the chamber and into contact with the catalyst. In some instances, the oxidant is a halogen and the catalyst catalyzes the oxidation of mercury to form a gaseous mercury-halogen compound, for example gaseous mercuric chloride.

A process for producing gaseous oxidized mercury is also provided. The process can include providing the mercury oxidation system described above and flowing mercury into the chamber. In addition, an oxidant, e.g., chlorine, can be passed into the chamber with the mercury and chlorine allowed to come into contact with the catalyst. In some instances, the flow of mercury and chlorine provides a precursor stream that is rich in the chlorine. For example, the ratio of chlorine molecules to mercury atoms can be in the range of 0.8:1 to 1.4:1.

Upon coming into contact with the catalyst, gaseous mercuric chloride is produced. The gaseous mercuric chloride can then be provided to a CMM for the purpose of providing a known quantity of a calibration gas. In this manner, the CMM can be calibrated with a known amount of mercuric chloride. In the alternative, it is appreciated that the mercury oxidation system can be used to provide pure mercury to the CMM if such a source is desired for testing and/or calibration.

DETAILED DESCRIPTION OF THE PREFERRED EMBODIMENTS

Figure 1:
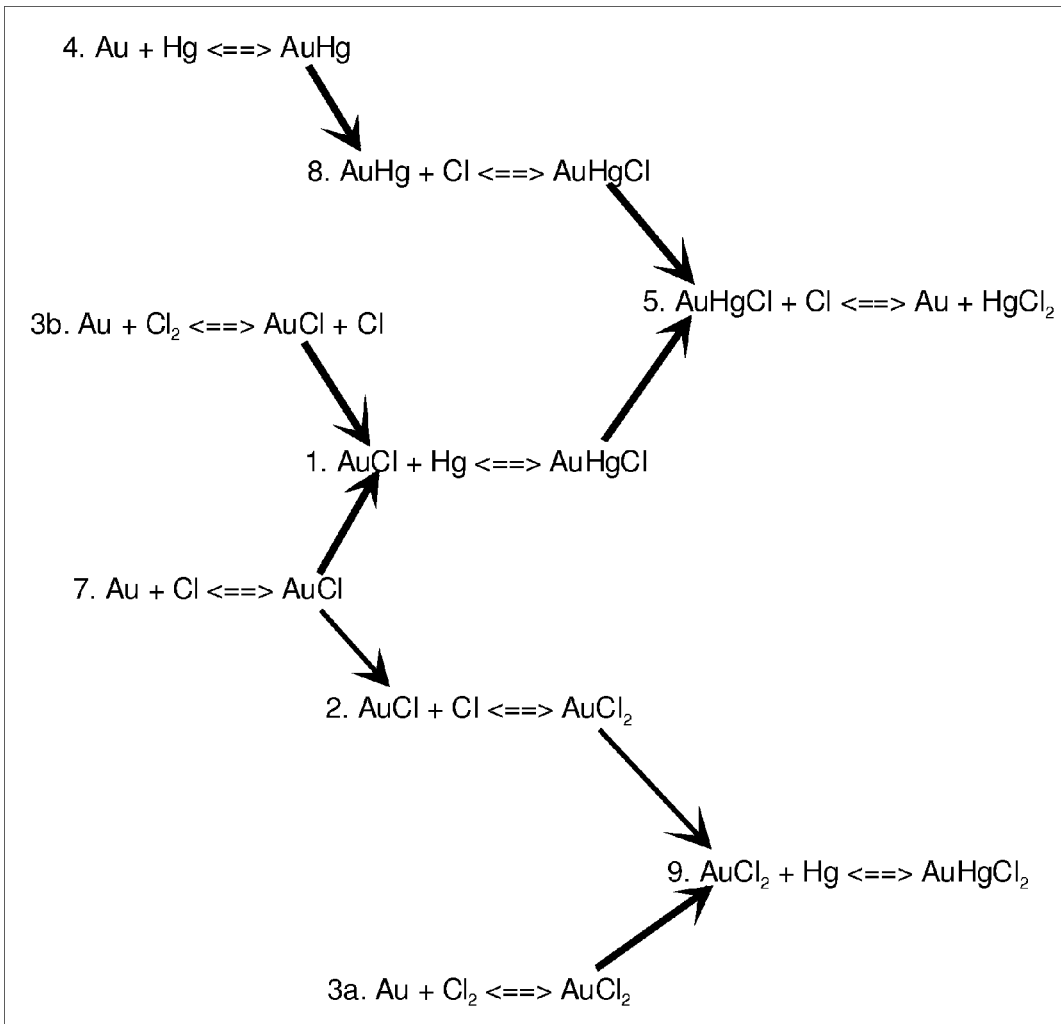
FIG. 1 is a schematic of several possible reactions between single atoms of mercury, gold, molecular chlorine, and atomic chlorine.

The present invention discloses a catalyst for the conversion of elemental mercury to a gaseous transportable oxidized form of mercury which is suitable for testing a CMM. Also disclosed is a system and a process for producing the oxidized mercury. As such, the present invention has utility as a catalyst, system, and process for producing oxidized mercury that can be used as a calibration source.

The catalyst can include a substrate and a layer attached to at least part of the substrate. The layer can contain a noble metal and have an average thickness of less than 100 nanometers. In some instances, the average thickness of the layer attached to at least part of the substrate can be less than 50 nanometers and can be of the order of a few atomic radii of noble metal atoms contained in the layer.

The substrate can be inert with respect to reactions with mercury, halogens, and mercury—halogen compounds. In some instances, the substrate is a plurality of glass fibers that provide a large surface area for the layer to attach to. In other instances, the substrate is a porous substrate that provides a large surface area for the layer to attach to. For example and for illustrative purposes only, the porous substrate can be a microporous substrate, a mesoporous substrate, and/or a macroporous substrate.

A mercury oxidation system that can produce gaseous oxidized mercury is also disclosed. The system can include a chamber that has a mercury inlet, an oxidant inlet, and an oxidized mercury outlet. A source of mercury can be in fluid communication with the mercury inlet, and a source of oxidant can be in fluid communication with the oxidant inlet. The catalyst described above can be located within the chamber, and a heater may or may not be provided that is operable to heat the catalyst to a temperature above 93° C. (200° F.). With the source of mercury and the source of oxidant in fluid communication with the chamber, fluid mercury and fluid oxidant can enter the chamber and come into contact with the catalyst. It is appreciated that upon contacting the catalyst, the mercury can be oxidized with the oxidant to form a gaseous mercury—oxidant compound. In some instances, the oxidant is a halogen and can include chlorine. In addition, the noble metal of the catalyst can be gold which can catalyze the reaction between mercury and chlorine to produce gaseous mercuric chloride ($HgCl_2$).

A process for producing gaseous oxidized mercury can include providing the catalyst described above, a fluid mercury source, and a fluid oxidant source. Thereafter, the fluid mercury and the fluid oxidant can flow into the chamber and come into contact with the catalyst. The catalyst can aid in the reaction of mercury with the oxidant to form gaseous oxidized mercury. In addition, the gaseous oxidized mercury can be allowed to exit the chamber and be transported to a desired location, e.g., in contact with a CMM. In some instances, the catalyst is held at an elevated temperature, for example above 93° C. (200° F.). In other instances, the catalyst is held at a temperature between 100° C. (212° F.) and 315° C. (600° F.). In addition, the fluid mercury and the fluid oxidant can be mixed to provide a precursor stream that flows into contact with the catalyst in order to produce the oxidized mercury. In some instances, the precursor stream can be rich in the oxidant. For example and for illustrative purposes only, if the oxidant is chlorine, the ratio of chlorine molecules to mercury atoms can be between 0.8:1 and 1.4:1.

Not being bound by theory, it is postulated that elemental mercury reacts with various halogen compounds in the presence of certain metal catalysts in order to form gaseous oxidized mercury. For example and for illustrative purposes only, gaseous mercury and gaseous chlorine in the presence of solid gold can react to form mercury chlorine compounds including mercury (I) chloride, mercurous chloride and mercuric chloride. In addition, mercury can amalgam with gold and chemically bond with chlorine which can also be chemically bonded to the gold.

In order to better understand the unexpected results provided by the catalyst discussed below, the kinetics and thermodynamics of the mercury, gold, and chlorine system were studied. In particular, intermediate states of mercury reacting with gold and chlorine were studied using a chemical model that included a single gold atom, a mercury atom, and a chlorine molecule. Possible reactions responsible for catalytic effects between gold, mercury, and chlorine are shown in FIG. 1.

Rate constants were also computed for transitions between the various species shown in FIG. 1 using transition state theory (TST) and variation transition state theory (VTST). The computed rate constants are shown in Table 1 and are appreciated to be dependent on calculations performed using density functional theory (DFT), specifically the model MPW3LYP which is a hybrid DFT method. The code for this model was interfaced to a

TABLE 1

Rate constants, thermodynamic, and kinetic data at 298.15K for the reactions illustrated in FIG. 1.

| No. | Reaction | $k_{tst}$, L/s/mol | $k_{vtst}$, L/s/mol | Barrier Height, TST | |
|---|---|---|---|---|---|
| 1 | $AuCl + Hg \Leftrightarrow AuHgCl$ | 9.30E+00 | 8.41E+00 | | |
| 2 | $AuCl + Cl \Leftrightarrow AuCl_2$ | 1.16E+02 | 9.10E−08 | | |
| 3a | $Au + Cl_2 \Leftrightarrow AuCl_2$ | 3.57E+09 | 5.37E+09 | | |
| 3b | $Au + Cl_2 \Leftrightarrow AuCl + Cl$ | 3.57E+09 | 5.37E+09 | | |
| 4 | $Au + Hg \Leftrightarrow AuHg$ | 2.68E+10 | 1.62E+10 | −6.969 | −11.067 |
| 5 | $AuHgCl + Cl \Leftrightarrow Au + HgCl_2$ | 2.15E+26 | 1.39E+26 | | |
| 6 | $Au + Cl \Leftrightarrow AuCl$ | Barrierless reaction | | −52.217 | −57.745 |
| 7 | $AuHgCl + Cl_2 \Leftrightarrow AuCl + HgCl_2$ | NA | NA | | |
| 8 | $AuHg + Cl \Leftrightarrow AuHgCl$ | Unstable transition state | | | |
| 9 | $AuCl_2 + Hg \Leftrightarrow AuHgCl_2$ | Unstable transition state | | | |

Gaussian 03 suite of programs installed on a SUN Microsystems server. The basis set was made up of 6-311+G(d,p) for chlorine molecules or atoms and LANL2DZ for mercury and gold. It is appreciated that the latter basis set contains effective core potentials that account for the relativistic effects of the mercury and gold atoms and treats the valence orbitals at the double zeta level.

With respect to the thermodynamics of the system, Gibbs free energies of the various reaction equations are shown in Table 2, along with enthalpy barrier heights for the reactions shown in FIG. 1. As shown in Table 2, compounds of AuHgCl are stable and remain solid; however, the compound $AuHgCl_2$ is highly unstable at elevated temperatures, e.g., at temperatures above 121° C. (250° F.). Therefore, it is appreciated that the formation of $AuHgCl_2$ quickly results in the release of $HgCl_2$ at elevated temperatures.

TABLE 2

Gibbs free energy ΔGrxn, ΔErxn, and enthalpy ΔHrxn as well as barrier height results for each reaction in FIG. 1.

| No. | Reaction | $\Delta G_{rxn}$ kcal/mol | $\Delta E_{rxn}$ kcal/mol | $\Delta H_{rxn}$ kcal/mol | Barrier Height, Kcal/mol | |
|---|---|---|---|---|---|---|
| | | | | | TST | VTST |
| 1 | $AuCl + Hg \Leftrightarrow AuHgCl$ | −11.468 | −17.965 | −18.557 | +9.972 | +16.191 |
| 2 | $AuCl + Cl \Leftrightarrow AuCl_2$ | −35.164 | −42.255 | −42.848 | +10.029 | +27.058 |
| 3a | $Au + Cl_2 \Leftrightarrow AuCl_2$ | −45.493 | −51.992 | −52.584 | +0.2924 | +4.179 |
| 3b | $Au + Cl_2 \Leftrightarrow AuCl + Cl$ | −10.329 | −4.094 | −9.736 | | |
| 4 | $Au + Hg \Leftrightarrow AuHg$ | −6.969 | −11.067 | −11.660 | −0.298 | +3.524 |
| 5 | $AuHgCl + Cl \Leftrightarrow Au + HgCl_2$ | −18.478 | −19.108 | −19.108 | | |
| 6 | $Au + Cl \Leftrightarrow AuCl$ | −52.217 | −57.745 | −57.745 | Barrierless reaction | |
| 7 | $AuHgCl + Cl_2 \Leftrightarrow AuCl + HgCl_2$ | −28.807 | −28.844 | −28.844 | | |
| 8 | $AuHg + Cl \Leftrightarrow AuHgCl$ | NA | NA | NA | Unstable transition state | |
| 9 | $AuCl_2 + Hg \Leftrightarrow AuHgCl_2$ | NA | NA | NA | Unstable transition state | |

Again, not being bound by theory, it is postulated that at least two mechanisms can be responsible for the reaction of mercury with chlorine using a catalyst containing a noble metal.

The first mechanism, hereafter Mechanism 1, involves the reaction of mercury and chlorine with single atoms of the noble metal. If the noble metal film is thick, that is, the film has properties of bulk noble metal, mercury atoms will amalgam with the noble metal structure and become unavailable for reaction with noble metal-Cl compounds. As such, mercury and/or mercury compounds stay bound to the noble metal film and the total mercury output from a reactor having such a catalyst is less than the total mercury input.

The second mechanism, hereafter Mechanism 2, involves reactions that occur on the edge structures of the noble metal film. Such active sites increase in population with an increase in surface area of a noble metal film and thus can provide increased effectiveness for the catalyst. For example, although gold is known as an inert material, catalytic reactions from gold are known to occur when the gold is in the form of nanoparticles, randomly distributed single atoms and/or small "islands", e.g., generally 10 nm in size. As such, the coating process disclosed herein populates the surface of the substrate with a desirable amount of catalytically active gold, and the process can depend on the deposition time and/or deposition rate.

Figure 2:
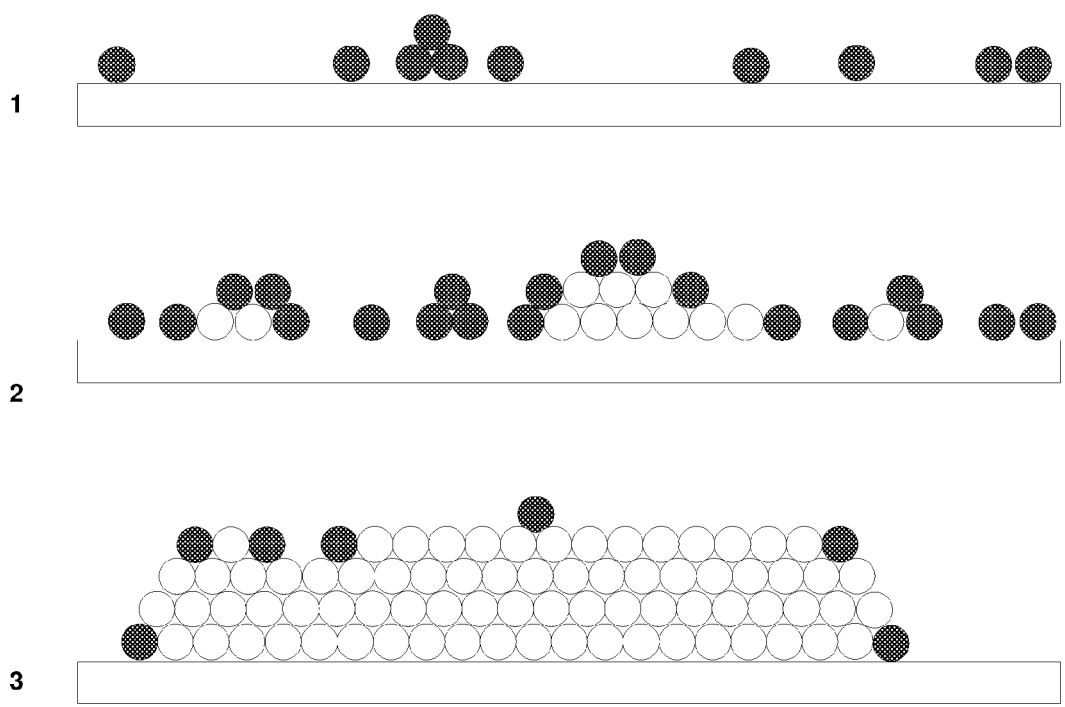
FIG. 2 is a schematic drawing illustrating three cases of noble metal deposition onto a substrate.

Referring now to FIG. 2, a schematic drawing illustrates three cases for catalysts with a noble metal deposited onto a substrate. The solid circles represent active noble metal atoms and/or sites and the hollow circles represent nonactive noble metal atoms and/or sites. The first case, labeled "1," in the figure represents less than a desirable amount of the noble metal deposited onto the substrate. In this case, most if not all of the noble metal atoms and/or sites are active; however, the mass of the noble metal is relatively low and the catalytic oxidation of mercury passing by the catalyst is mass-transfer-limited. As such, some of the mercury and oxidant are catalyzed, but an undesirable amount of the mercury passes by the catalyst without being oxidized. Stated differently, such a catalyst exhibits a low conversion rate of oxidized mercury.

The second case, labeled "2" represents a satisfactory and/or optimum case where the concentration of catalytically active sites is of the same magnitude as the concentrations of the mercury and/or oxidant. In some instances, the concentration of catalytically active sites is greater than the concentration of the mercury and/or oxidant, and a conversion efficiency of greater than 90% is achieved. As shown with this case, the active noble atom sites are present with non-active sites, however the deposited material has not approached the thickness where bulk material behavior is exhibited.

The third case, labeled "3," represents an unsatisfactory case in which too much noble metal has been deposited onto the substrate and the coating exhibits bulk material behavior. In such a case, mercury atoms can readily amalgam with the surface of the noble metal, but the oxidant molecules and/or atoms are less likely to absorb and/or chemically react with the mercury. As such, the noble metal is generally inert.

In some instances, the substrate can have up to half of its surface area uncoated with the noble metal film and thus have edge structure along interfaces between the noble metal thin film and the substrate material. In addition, thin films that are less than 100 nanometers thick can exhibit catalytic properties that are substantially different from thicker films or bulk material having the same chemical composition. As such, a substrate that provides a relatively high surface area in combination with a thin film that is less than 100 nanometers thick is postulated to provide enhanced reactivity with respect to mercury and an oxidant such as a halogen. This enhanced reactivity can provide conversion of between 97% and 100% of elemental mercury to oxidized mercury.

In some instances, the substrate can be fibrous, or in the alternative, the substrate can be porous. For example and for illustrative purposes only, the substrate can be a quartz fiber filter, microporous substrate, mesoporous substrate, macroporous substrate, and/or combinations thereof. For the purpose of the present invention, the term "microporous" is defined as pores having a mean pore diameter of less than 2 nanometers; the term "mesoporous" is defined as pores having a mean pore diameter of between 2 nanometers and 50 nanometers, inclusive; and the term "macroporous" is defined as pores having a mean pore diameter of greater than 50 nanometers.

The noble metal can include ruthenium, rhodium, palladium, silver, osmium, iridium, platinum, gold, and combinations thereof. In some instances, the noble metal contains gold and has a surface density equal to or greater than 10 $\mu g/cm^2$. In other instances, the surface density can range from 12 $\mu g/cm^2$ to 25 $\mu g/cm^2$. In still other instances, the surface density can range from 12.4 $\mu g/cm^2$ to 24.1 $\mu g/cm^2$. For example and for illustrative purposes only, a catalyst film containing gold and having a surface density of approximately 20.2 $\mu g/cm^2$ provides excellent catalytic properties with respect to catalyzing the reaction of mercury with chlorine to produce gaseous $HgCl_2$. The corresponding thicknesses of the noble metal layer that is attached to at least part of the substrates, assuming a flat surface, are between generally 265 angstroms (Å) and 398 Å for the surface densities of 12.4 $\mu g/cm^2$ to 24.1 $\mu g/cm^2$, respectively, and 332 Å for the surface density of 20.2 $\mu g/cm^2$.

It is appreciated that the substrate can be any suitable material known to those skilled in the art that is inert with respect to mercury, oxidants such as halogens, mercury-halogen compounds, and the like. For example and for illustrative purposes only, the substrate can be a quartz fiber filter, a quartz sponge material, a plurality of porous quartz particles, and the like. In addition, the catalyst can be operable over a wide range of temperatures, such as between 93° C. (200° F.) and 232° C. (450° F.), between 107° C. (225° F.) and 177° C. (350° F.), and/or 116° C. (240°F.) and 121° C. (250° F.).

The catalytic film can be applied to the substrate using any means, process, technique, and the like known to one skilled in the art, illustratively including physical vapor deposition (PVD) techniques, chemical vapor deposition (CVD) techniques, sol-gel processing techniques, and the like. In particular and for illustrative purposes only, the catalytic film can be applied to the substrate using vacuum sputtering.

Figure 3:
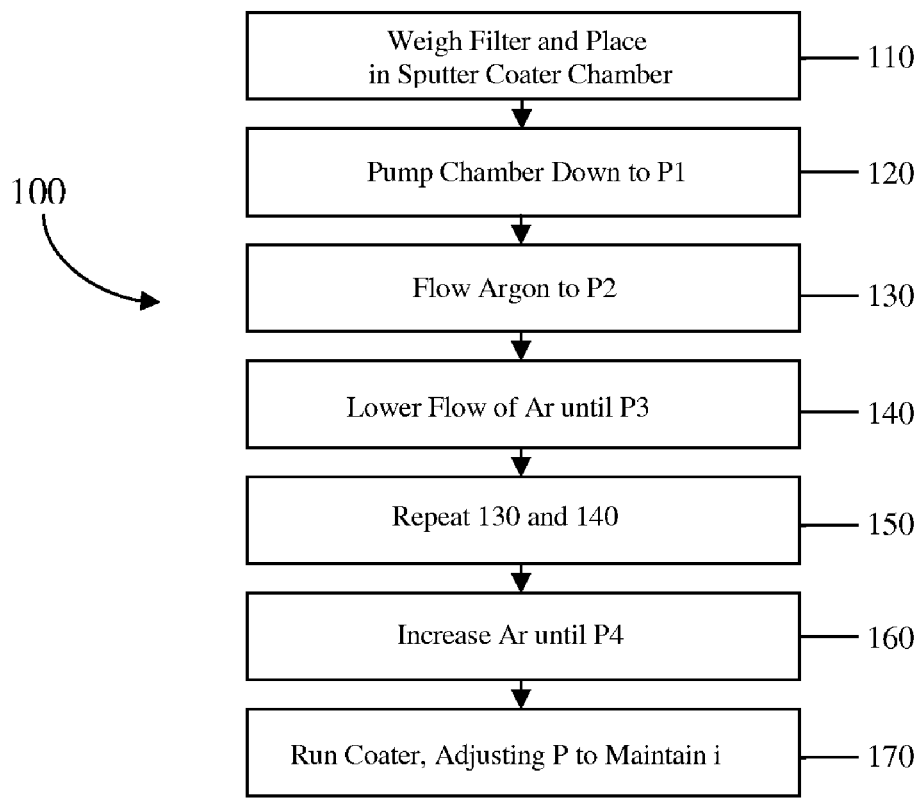
FIG. 3 is a flow diagram of a substrate coating procedure suitable for preparing a mercury oxidizing catalyst according to an embodiment of the present invention.

Turning now to FIG. 3, a schematic flowchart for a process for producing the catalyst is shown generally at reference numeral 100. The process 100 can include providing a substrate, e.g., a quartz fiber filter, weighing the substrate, and placing it in a sputter-coating chamber at step 110. Thereafter, the pressure of the chamber can be pumped down to a first pressure P1 at step 120. At step 130, an inert gas, for example argon, can flow into the chamber to increase the pressure therein to a second pressure P2. In this manner, the chamber is flooded with the inert gas to "drive out" any residual air, moisture, and the like that can offgas from the substrate.

The flow of inert gas can be lowered again to a third pressure P3 at step 140, and steps 130 and 140 can be repeated as many times as desired at step 150 in order to ensure that gases present in the substrate, fibers, etc., are eliminated and/or reduced to a desirable level prior to coating. At step 160, the pressure of the inert gas can be increased to a fourth pressure P4 and the coating applied to the substrate at step 170 by operating the coating apparatus, adjusting the pressure if necessary, and maintaining a constant and desirable current (i). In some instances, the first pressure P1 can be approximately 0.1 millibar, the pressure P2 approximately 5 millibar, the pressure P3 less than 0.1 millibar, and the pressure P4 approximately 2.0 millibar. In addition, a desirable current can be approximately 19.5 milliamps.

Assuming for a first approximation that the target is a flat surface, the catalytic film thickness can be estimated using the expression:

$$d = KiVt \qquad [\text{Eq. 1}]$$

where d is the thickness of the film in Å; K is a constant related to the source of noble metal, inert gas, and distance between the source and the substrate; i is the current in milliamps; V is the voltage in kilovolts; and t is the deposition time in seconds. As such, the deposition rate (d/t) can be adjusted or modified by changing the current and/or voltage of the coating system.

For example and for illustration purposes only, a deposition rate of between 3.1 Å per second and 3.4 Å/s can be maintained for a desired length of time such that a desired thickness of the catalytic film can be produced. In particular, a deposition rate of approximately 3.32 Å/s can be established and maintained in order to produce a thin gold film that is attached to at least part of the substrate and has the surface densities as discussed above.

In some instances, the catalyst can be further conditioned after being manufactured and prior to initial use. For example, initial use of the catalyst can be prefaced by a "break-in" time of 2 hours during which time capture of elemental mercury can occur. Thereafter, the release of mercury can occur from the catalytic film such that an equilibrium state exists between the film and the elemental mercury. In addition, subsequent use of the conditioned catalytic film can include an equilibration time to allow the output concentration of gaseous oxidized mercury to stabilize. In some instances, the equilibration time is on the order of 30 minutes.

Figure 4:
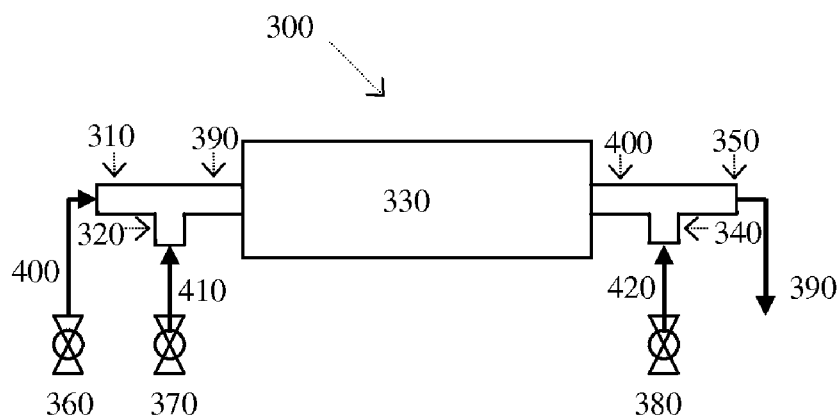
FIG. 4 is a schematic drawing of a system for the oxidation of elemental mercury according to an embodiment of the present invention.

Turning now to FIG. 4, a schematic diagram of a system for oxidizing mercury is shown generally at reference numeral 300. The mercury oxidation system 300 can provide gaseous oxidized mercury from one or more precursors that contain elemental mercury and an oxidant. In some instances, a first precursor contains the elemental mercury and a second precursor contains the oxidant. The oxidizing mercury system 300 can include an oxidant inlet 310, an elemental mercury inlet 320, and a dilution gas inlet 340. As illustrated in the figure, these inlets can be in communication with an oxidation reactor 330, and the reactor 330 can be in communication with a system outlet 350. The system 300 can also include a first regulator valve 360 which is in fluid communication with the oxidant inlet 310, a second regulator valve 370 which is in fluid communication with the mercury inlet 320, and a gas regulator valve 380 in fluid communication with the gas inlet 340.

During operation, a stream of elemental mercury 410 and a stream of an oxidant 400 can be provided and mixed to yield a precursor stream 390 that is fed into the oxidant reactor 330. It is appreciated that the catalyst can be present within the reactor 330, although it is not shown in the figure. In some instances, the stream of elemental mercury 410 can further include an inert carrier gas that can dilute the concentration of the elemental mercury entering into the reactor 330 and/or aid in the flowing of the mercury therethrough. In addition, the stream of oxidant 400 can also include an inert carrier gas that can perform the same duties as the inert carrier gas with the stream of elemental mercury.

Upon entering the reactor 330, the elemental mercury and the oxidant can come into contact with the catalyst, and the mercury can react with the catalyst and/or the oxidant to produce gaseous oxidized mercury. As stated above, the oxidant can be a halogen such that a mercury—halogen compound is provided, e.g., the oxidant can be chlorine, and $HgCl_2$ can be produced. In some instances, the catalyst can have a catalyst holder that can be independently heated. As such, the catalyst holder can heat the catalyst to a temperature above 93° C. (200° F.).

In some instances, the concentration of elemental mercury within the stream 410 and the concentration of the oxidant within the stream 400 provide for the precursor stream 390 to be "rich" in the oxidant, i.e., the concentration of oxidant atoms is greater than the concentration of mercury atoms. For example and for illustrative purposes only, the ratio of chlorine molecules to mercury atoms can be between 0.8:1 and 1.4:1. In other instances, the ratio of chlorine molecules to mercury atoms is at least 1.2:1. In this manner, sufficient catalyst-oxidant compound can form on the surface of the catalyst to effectively react with all of the mercury that is present. Stated differently, with the oxidant concentration in the reactor 330 being slightly greater than the mercury concentration, substantially all of the mercury entering into the reactor 330 can be reacted with the oxidant for extended periods of time in a predictable manner.

In order to control the flow rate and/or concentration of the mercury and/or the oxidant, the first regulator valve 360 and the second regulator valve 370 can be adjusted as known to one skilled in the art. In addition, the first regulator 360 and the second regulator 370 can be adjusted such that the system 300 can provide elemental mercury and/or oxidized mercury to the system outlet 350.

The system 300 is capable of oxidizing and converting to a transportable form greater than 90% of incoming elemental mercury and, in some instances, greater than 95% of the incoming elemental mercury. It is appreciated that the amount of elemental mercury entering into the oxidation reactor 330 can be directly measured and compared with the amount of oxidized mercury and/or elemental mercury exiting from the system outlet 350. In this manner, the effectiveness of the catalyst in converting the elemental mercury to a gaseous oxidized mercury can be determined.

In some instances, a manifold (not shown) for regulating the pressure of an incoming carrier gas and for splitting a stream of the carrier gas into a plurality of streams can be provided. The manifold can split the carrier gas stream into three streams, for example one stream for use as a sweep gas for an elemental mercury permeation source, one stream for use as a sweep gas for an oxidant permeation source, and one stream for use as dilution for the gaseous oxidized mercury exiting the oxidation reactor 330. In this manner, a single inert gas source can be used for the system 300.

One advantage of the system 300 is that the oxidation reactor 330 can have a size that affords for mounting to a CMM probe and thereby affords injecting elemental mercury and/or oxidized mercury directly to an inlet of the probe. In this manner, problems associated with transporting oxidized mercury to a CMM system are reduced and/or eliminated. In addition, the system 300 can use mercury, an oxidant, flowmeters, temperature control devices, and the like that are traceable to NIST sources. As such, the system 300 can provide a NIST-traceable source of $HgCl_2$.

It is appreciated that the system 300 can be installed with each CMM or with a group of CMMs within a commercial power plant, or in the alternative, be provided as a mobile unit that can be used for semiregular checks, calibrations, certifications, and the like at different power plants. It is further appreciated that the mercury oxidation system 300 can be used for quality assurance and quality control of CMM installations, fundamental experiments in chemistry, support of testing, and researching novel measurement techniques. For instance and for illustrative purposes only, the system 300 can be used to develop a device for reducing oxidized mercury to elemental mercury.

Figure 5:
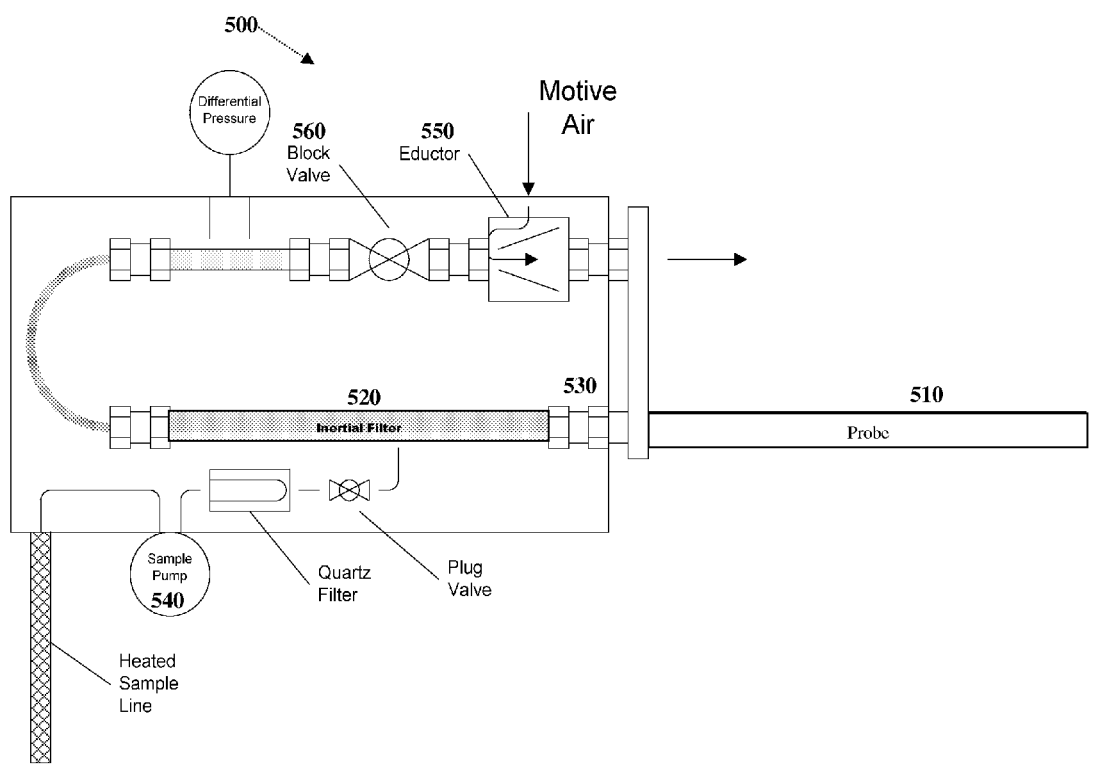
FIG. 5 is a schematic drawing of a prior art inertial separation probe (ISP)

Turning now to FIG. 5, a schematic diagram illustrating a prior art ISP is shown generally at reference numeral 500.

Flue gas can be drawn through a probe 510 from an exhaust stack at a power plant using an eductor pump 550. The flue gas passes through an inertial filter 520 that extracts a small particle-free sample. Thereafter, single- or multiple-point calibrations are performed by introducing a suitable test gas at sample inlet 530. During calibrations, elemental or ionic calibration gas can be introduced and the main loop flow is reduced. In addition, dynamic standard additions or spikes may be performed by maintaining the main loop flow at a normal sampling rate and injecting a high concentration of standard gas at a low, precisely known flow rate. The sample to be tested is pumped via sample pump 540 to the conditioner or other test or pretest apparatus.

Figure 6:
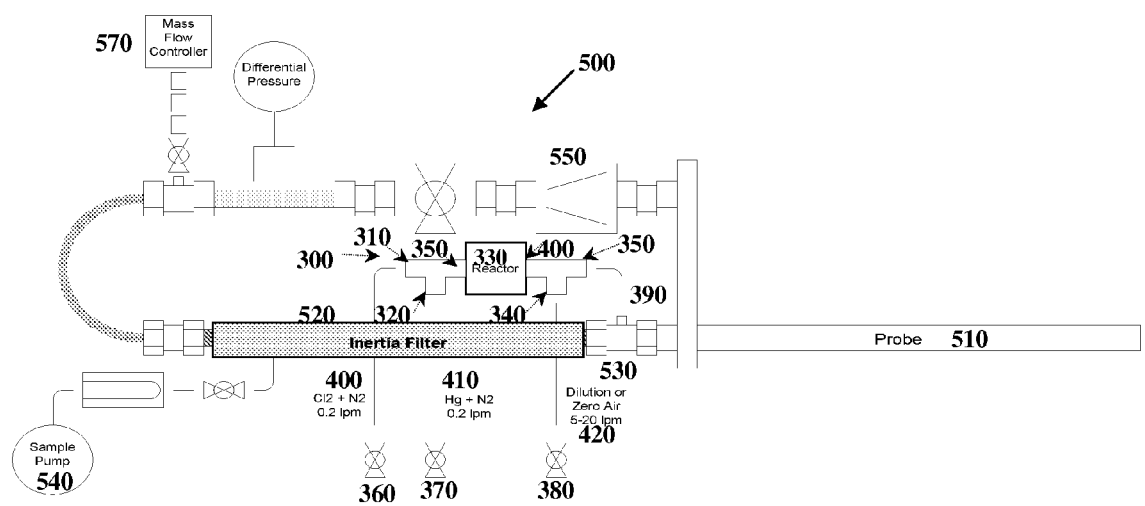
FIG. 6 is a schematic drawing of an ISP retrofitted with an oxidized mercury system according to an embodiment of the present invention.

Looking now at FIG. 6, an example of how a current CMM, e.g., the ISP 500, can be modified with the installation of the mercury oxidation system 300 is shown. In particular, a port can be located downstream of the inertial filter 520 and used to draw a controlled flow through the filter 520 in order to accurately control the loop flow for dynamic spiking of the flue gas. For example, with the system outlet 350 in communication with the sample inlet 530 of the ISP 500, a spike of $HgCl_2$ having a known concentration and produced by the system 300 as described above can be injected into the CMM. Thereafter, the signal or reading by the ISP 500 can be compared with the known concentration of the $HgCl_2$ spike and used for testing purposes. For calibration checks, it is appreciated that the loop flow may not be as accurately determined as desired; however, the flow can be less than the calibration gas flow being injected, and thus the probe can be flooded with calibration gas.

It is appreciated that the elemental mercury and oxidant sources can be external to the ISP 500 and thus can be placed at a desirable distance therefrom. It is further appreciated that the system 300 is operable at probe hot-box temperatures and can be sized to fit within existing hot boxes, the term hot box understood to mean the container that a CMM is typically housed in for protection from dust, rainwater, steam, and the like.

In order to better illustrate various aspects of the invention, three examples are provided below.

EXAMPLE 1

Figure 7:
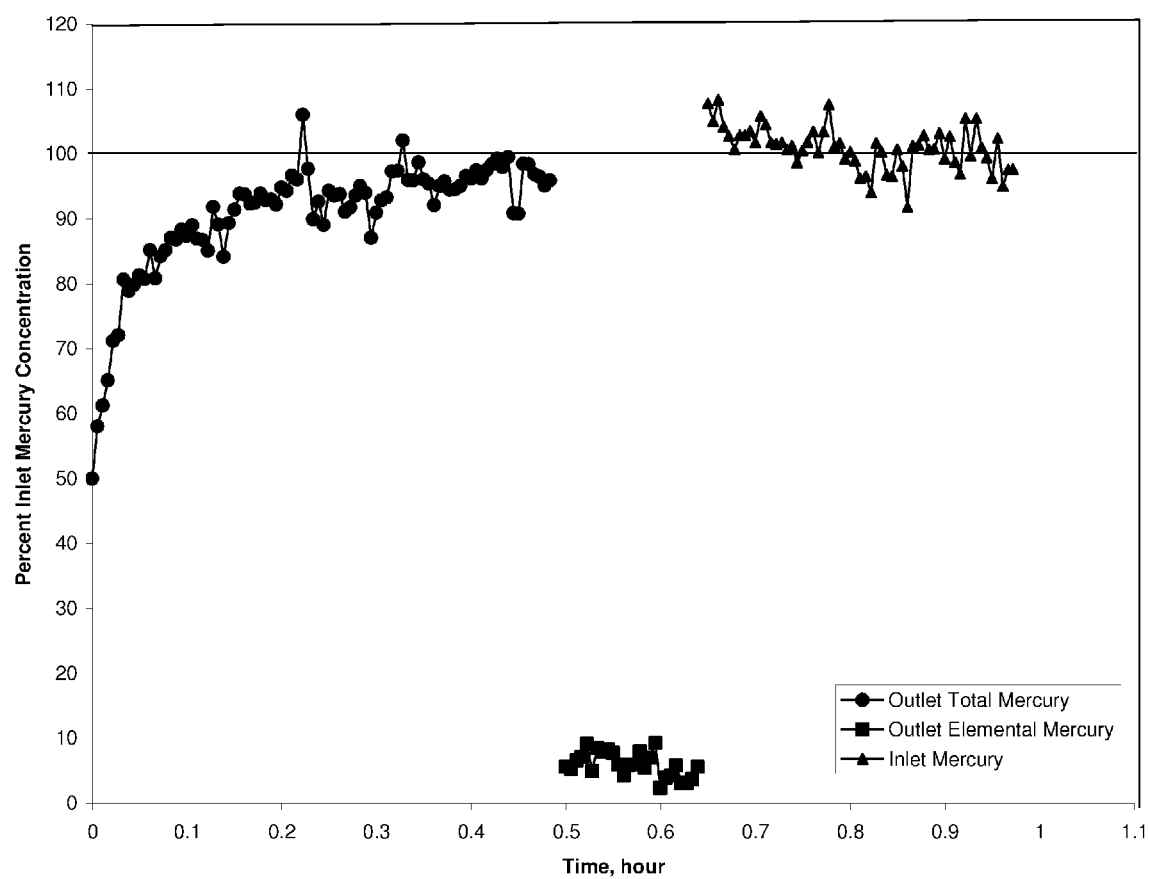
FIG. 7 is a graph illustrating percent inlet mercury concentration as a function of time.

A bench-scale flue gas simulator was used to test gold as a catalyst for oxidizing elemental mercury in flue gas. A sputtering technique was used to create a catalyst by coating pieces of fabric filter cloth with gold. The fabric filter cloth had 10 μg/cm$^2$ of gold sputtered thereon and the catalyst was exposed to elemental mercury in a simulated flue gas. FIG. 7 shows a graph that illustrates the percent mercury concentration for inlet mercury, outlet elemental mercury and outlet total mercury as a function of time. The data in FIG. 7 illustrate a rapid increase to 90% to 95% of total outlet mercury with between 2% and 10% outlet elemental mercury. As such, the test illustrates that the total mercury output quickly approached 100% of the inlet concentration as well as approaching 100% oxidation of the inlet elemental mercury.

EXAMPLE 2

Figure 8:
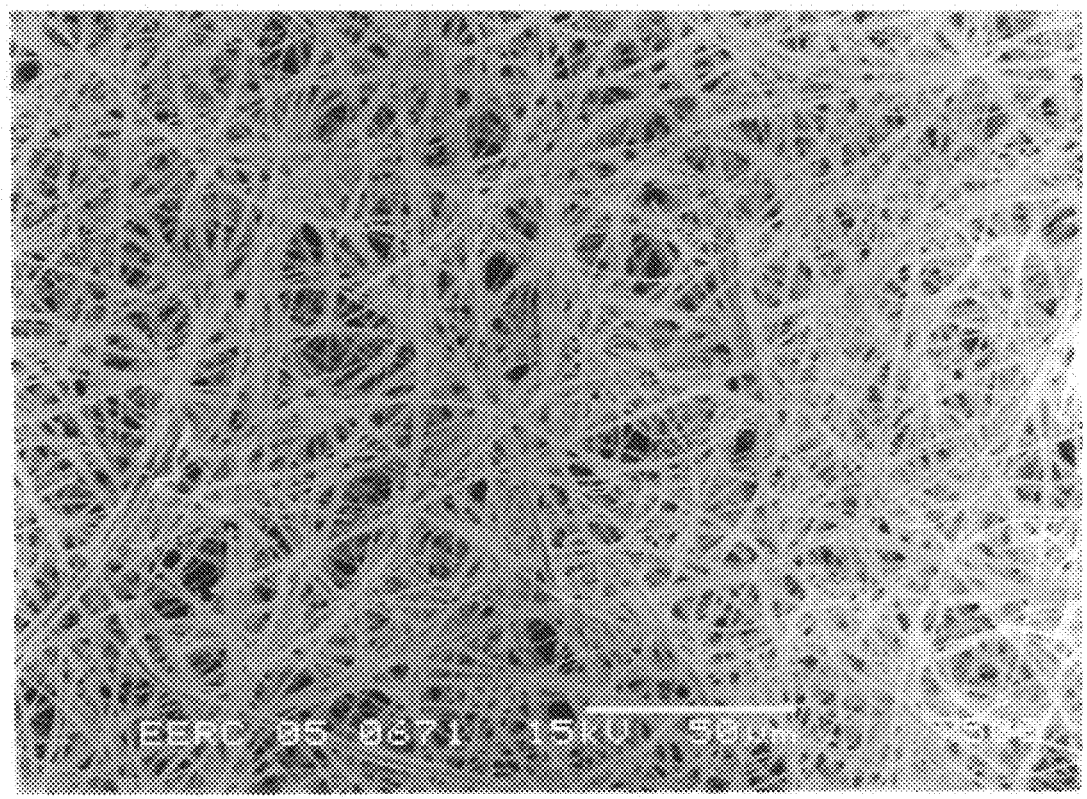
FIG. 8 is a scanning electron microscope (SEM) image of a gold-coated quartz catalyst according to an embodiment of the present invention.

Catalysts were made using a vacuum gold-sputtered deposition apparatus typically used for the preparation of SEM samples. Quartz tissue filters obtained from Pall Gelman Science were baked overnight at 600° C. and stored in a desiccator before being weighed and coated with gold. The sputter coater was adjusted so that the distance between a gold foil and the filter was approximately 50 millimeters. FIG. 8 illustrates a SEM image of the gold-coated quartz catalyst which was coated at a deposition rate of approximately 3.32 Å/s. For a deposition time of 100 seconds, this deposition rate corresponded to a film 100 atoms thick on a smooth surface. However, since the support is a porous tissue made of pressed fibers, the thickness of the gold film is assumed to be much less than this value. By comparing the color of the filters coated for 100 seconds to coatings applied to microscope slides, the true thickness is approximated to be between 3 and 10 atoms thick.

Figure 9:
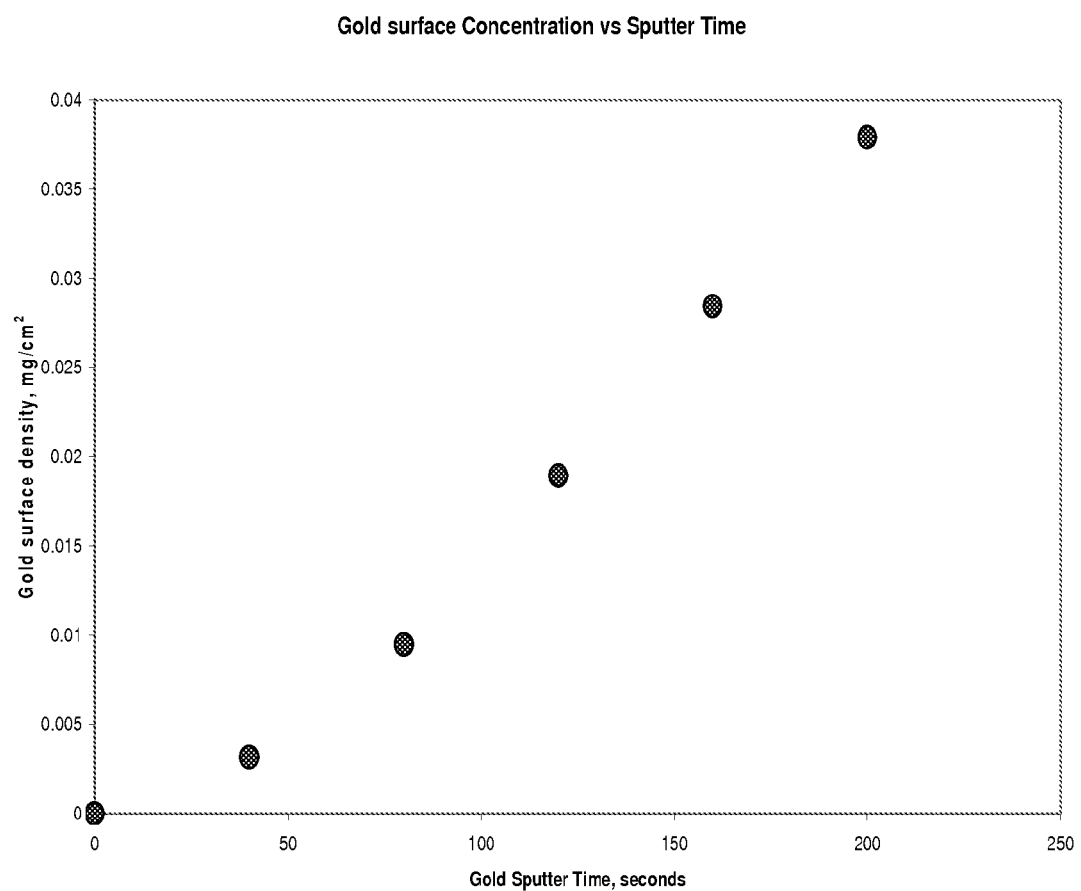
FIG. 9 is a graph illustrating surface density vs. sputter time for the sputtering of gold onto a generally flat surface.

The gold deposition was also determined by using the mass before and after coating of the filter. From this measurement, a graph of gold surface density as a function of gold sputter time was able to be calculated and is shown in FIG. 9. This graph illustrates a generally linear relationship between the gold surface density that was deposited as a function of gold sputter time after approximately 50 seconds.

Figure 10:
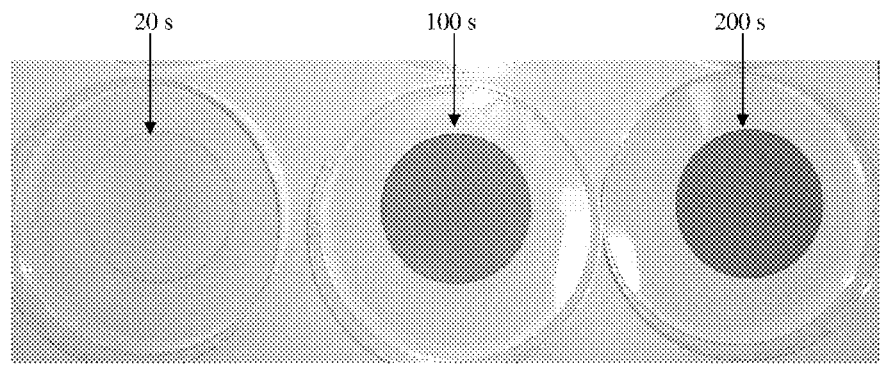
FIG. 10 is a photograph of quartz sputter coated with gold at deposition times of 20, 100, and 240 seconds.

In addition, catalysts of gold-coated quartz fibers that were sputtered for 20 seconds, 100 seconds, and 240 seconds are shown in FIG. 10. Above 200 seconds of deposition, the gold film exhibited properties of bulk gold as indicated by the recognizable golden appearance of the film that can be observed from a color photograph. Below this amount, the deposition of gold appeared to be a light purple color. Catalysts coated within the range of 20 seconds to 260 seconds were tested and did show that bulk gold thicknesses did not yield desirable quantities of transportable $HgCl_2$.

EXAMPLE 3

Parametric testing was performed for a portable prototype of a mercury oxidation system capable of producing gaseous oxidized mercury with an efficiency of greater than 98%. A Nippon DM-6B mercury analyzer collected data at least once per second and was used for analyzing total and elemental mercury simultaneously and collected data at least once per second. In addition, average concentrations at 10 second and 1 minute intervals were reported. Measurements were made with a product gas flowing at 101 liters per minute and a slipstream being "pulled off" of the product gas several centimeters before entering a CMM conversion/conditioning system.

It is appreciated that the mercury oxidation system can be used with compressed air or nitrogen for the dilution gas, and nitrogen gas can be used with the permeation sources. Typical flow rates for a dilution gas can be between 1 and 201 liters per minute, and for a permeation source gas of flow rates can be between 0.4 and 1 liter per minute. It is worthy to note that power consumption for such a system is generally less than 700 watts.

Figure 11:
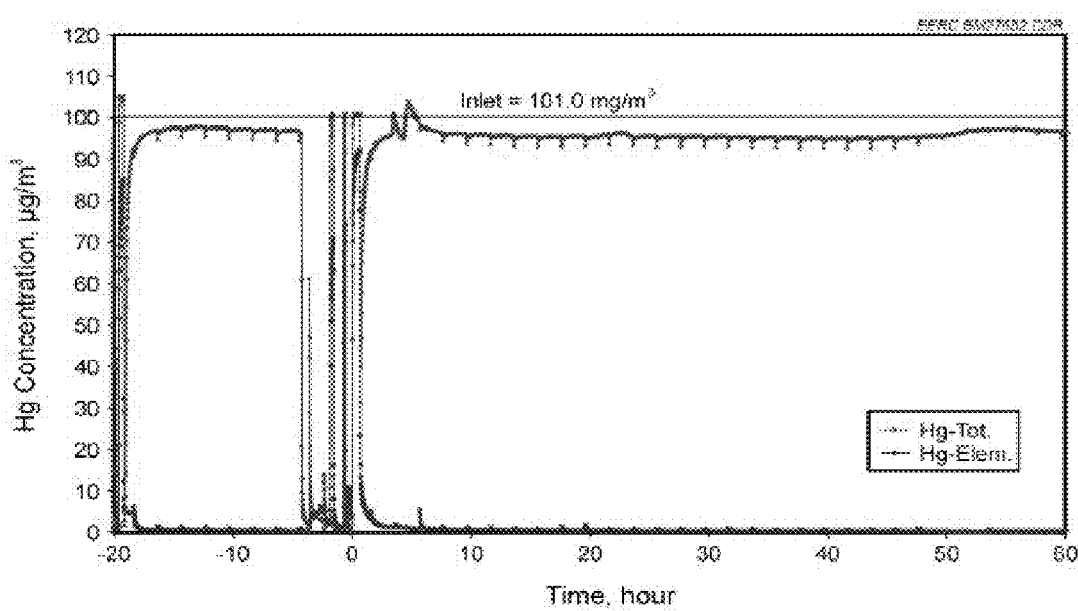
FIG. 11 is a graph illustrating outlet mercury concentration as a function of time for an mercury oxidation system according to an embodiment of the present invention.

Referring now to FIG. 11, a graph illustrating mercury concentration as a function of time (t) is shown for the output of the mercury oxidation system. At t=−20 hours, inlet mercury is measured for approximately 1 hour. The system is then put into operation where steady state production of oxidized mercury occurs between 30 and 60 minutes from the initial start and a variation in output is within 1%. At approximately t=−4 hours, the system is shut down and maintenance performed in preparation for long-duration testing. At t=0 hours, inlet mercury is measured for about 1 hour, and the system is then put into operation. As shown in this figure, the Nippon mercury analyzer indicates that more than 95% of the mercury entering into the oxidation reactor of the system is oxidized and exits the system. The 30-to 60-minute break-in period is due to the equilibration of the reaction components on the catalyst and depends on the concentration of the precursors and the temperature of the catalyst.

Experiments were also conducted in order to measure the emission rate using a series of OH method wet-chemistry tests. It is appreciated that OH method testing is one of the most proven techniques for measuring mercury in flue gas. However, OH method testing is a manual wet-chemistry method and is thus personnel-intensive, time-consuming, and expensive to perform. For each OH method test, the mercury oxidation system was allowed approximately 1 hour to equilibrate while output gas from the system was monitored with a Nippon DM-6P. Each OH method test was executed for about 9 minutes, and the results were used to compute the collected elemental and oxidized mercury.

Figure 12:
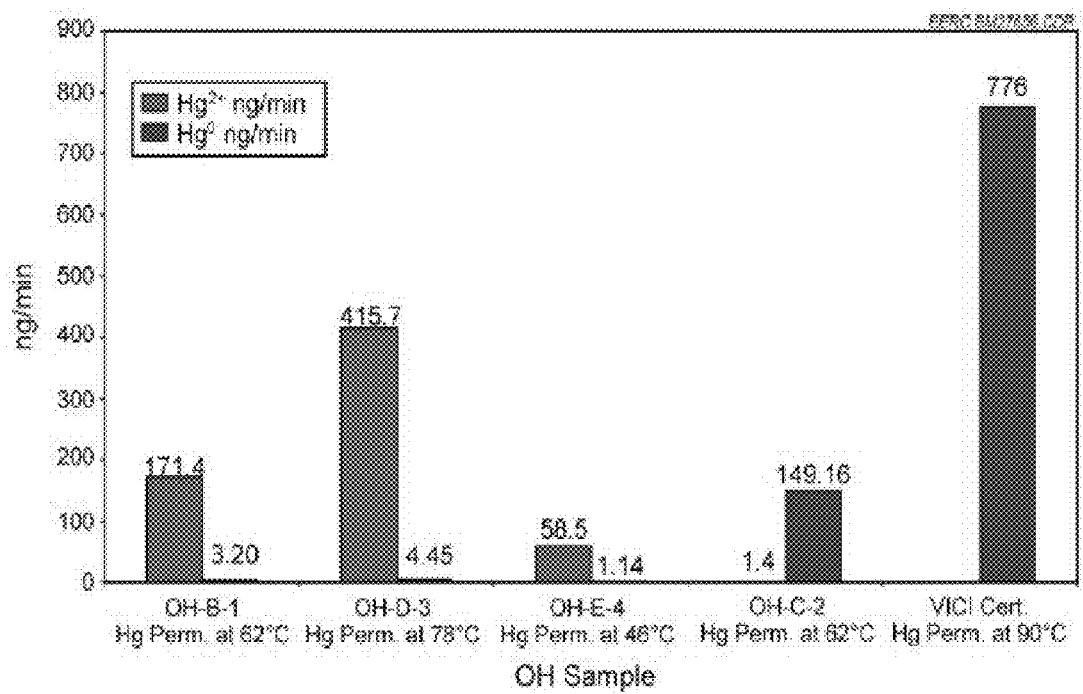
FIG. 12 is a column chart illustrating elemental and oxidized mercury emission rates for various test Ontario Hydro (OH) samples.
Figure 13:
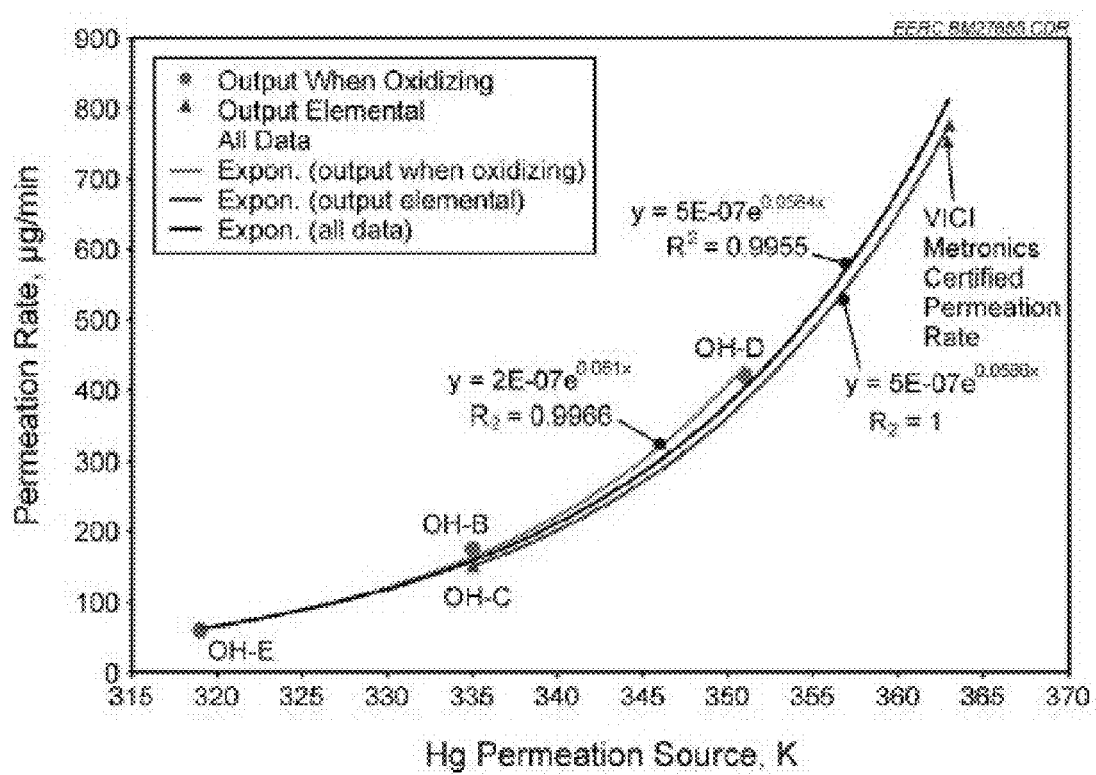
FIG. 13 is a graph illustrating permeation rate as a function of absolute temperature for a $Hg^0$ permeation source.

Computed emission rates for various test samples are shown in the column chart illustrated in FIG. 12. FIG. 13 is a graph illustrating the emission rates shown in FIG. 12 as a function of permeation rate and absolute temperature of the elemental mercury permeation source. As shown in FIG. 13, emission rates for the system are very close to the emission rates of the elemental mercury permeation source. As such, the oxidizing mercury system functions in a predictable manner.

Figure 14:
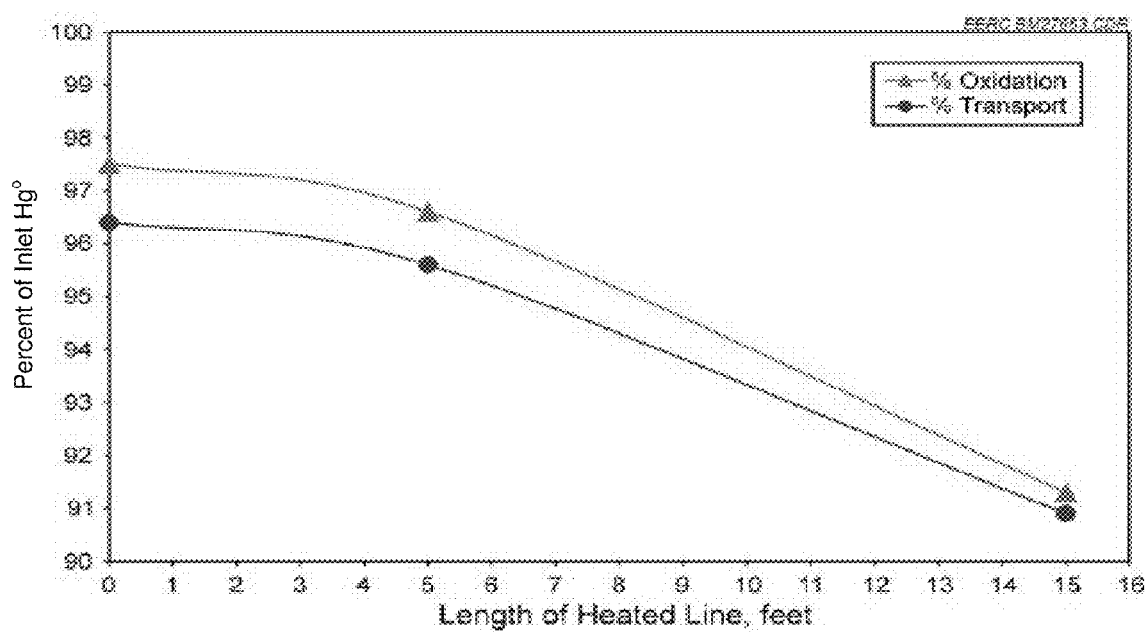
FIG. 14 is a graph illustrating measured percent mercury as a function of the length of a heated transport line.

Referring now to FIG. 14, experiments were conducted in order to determine the effect of various lengths of transportation tubing/line on output of mercury. The experiments used elemental mercury, with the length of a heated line ranging from 0 to 15 feet. As shown in this figure, a decrease in mercury output of approximately 6% is exhibited for heated tubing/line having a length of 15 feet. However, it is also shown that with a length of heated tubing/line up to 5 feet, the drop in output is less than 1%.

It is appreciated that the system can be operated such that its output provides elemental mercury, oxidized mercury and, if desired, no gas whatsoever. It is further appreciated that since the system functions in a predictable manner, any significant changes that occur to the output of the system can indicate sources or sinks of oxidized mercury.

The foregoing drawings, discussion, and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

We claim:

1. A mercury oxidation system for producing gaseous oxidized mercury, said system comprising:
    a chamber having a mercury inlet, an oxidant inlet, and an oxidized mercury outlet;
    a source of mercury in fluid communication with said mercury inlet;
    a source of oxidant in fluid communication with said oxidant inlet;
    a catalyst located within said chamber, said catalyst having a substrate and a layer attached to at least part of said substrate, said layer containing a noble metal and having an average thickness of less than 100 nanometers; and
    a heater, said heater operable to heat said catalyst to a temperature above 100° C.;
    wherein said source of mercury is operable to provide fluid mercury to said chamber and in contact with said catalyst and said source of oxidant is operable to provide fluid halogen to said chamber and in contact with said catalyst when said substrate is heated to a temperature above 100° C., said catalyst catalyzing the oxidation of mercury to form gaseous oxidized mercury.

2. The system of claim 1, wherein said oxidant contains a halogen.

3. The system of claim 2, wherein said halogen is chlorine.

4. The system of claim 1, wherein said substrate of said catalyst is a plurality of glass fibers.

5. The catalyst of claim 1, wherein said noble metal is selected from the group consisting of ruthenium, rhodium, palladium, silver, osmium, iridium, platinum, gold, and combinations thereof.

6. The system of claim 5, wherein said noble metal is gold.

7. The system of claim 6, wherein said gold has a surface density on said substrate between 12 milligrams per square centimeter and 25 milligrams per square centimeter.

8. A process for producing gaseous oxidized mercury comprising:
    providing a catalyst having a substrate and a layer attached to at least part of said substrate, the layer having an average thickness of less than 100 nanometers;
    providing fluid mercury;
    providing a fluid oxidant;
    flowing the fluid mercury and the fluid oxidant past the catalyst such that the fluid mercury and the fluid catalyst contact the layer and oxidizes to form gaseous oxidized mercury;
    and
    flowing the gaseous oxidized mercury away from the catalyst.

9. The process of claim 8, wherein the noble metal is selected from the group consisting of ruthenium, rhodium, palladium, silver, osmium, iridium, platinum, gold, and combinations thereof.

10. The process of claim 9, wherein the noble metal is gold.

11. The process of claim 10, wherein the gold has a surface density on the substrate between 12 milligrams per square centimeter and 25 milligrams per square centimeter.

12. The process of claim 11, wherein the conversion rate of fluid mercury to gaseous oxidized mercury is greater than 95%.

13. The process of claim 8, wherein the fluid oxidant contains a halogen.

14. The process of claim 13, wherein the halogen is chlorine.

15. The process of claim 14, wherein the fluid mercury and the fluid chlorine mix together to form a precursor stream before contacting the catalyst.

16. The process of claim 15, wherein the precursor stream has a concentration of chlorine atoms greater than a concentration of mercury atoms.

17. The process of claim 16, wherein the ratio of chlorine molecules to mercury atoms is in the range of 0.8:1 to 1.4:1.

18. The process of claim 8, further including heating the catalyst to a temperature above 100° C.

19. The process of claim 8, further including flowing the gaseous oxidized mercury into contact with a CMM for use as a calibration spike.

* * * * *